Nov. 23, 1926.
J. W. PATTERSON
WATER BOTTLE AND THE LIKE
Original Filed Nov. 18, 1922   3 Sheets-Sheet 1
1,607,963
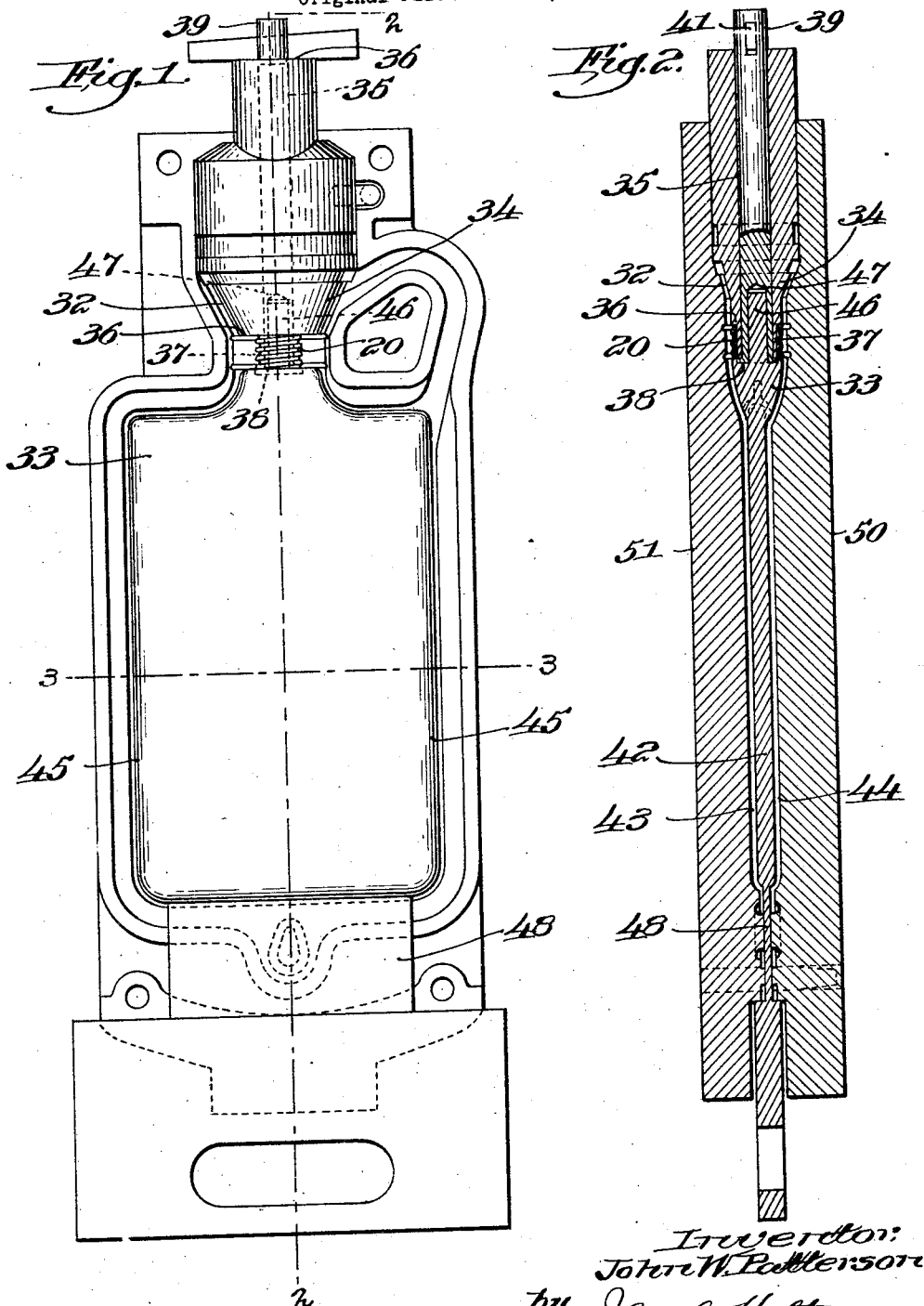
Inventor:
John W. Patterson
by Jesse A. Holton
His Atty

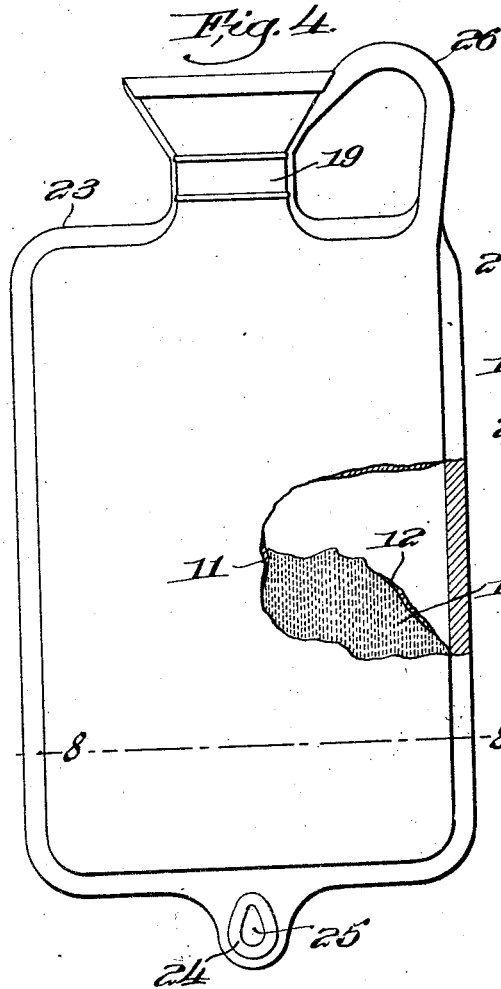
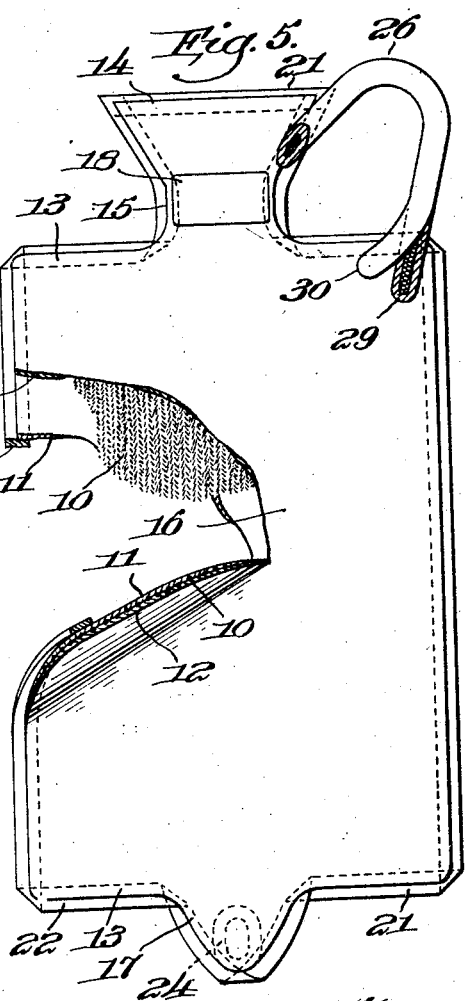

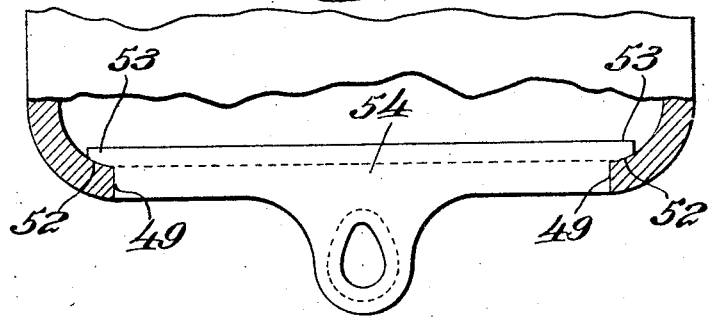
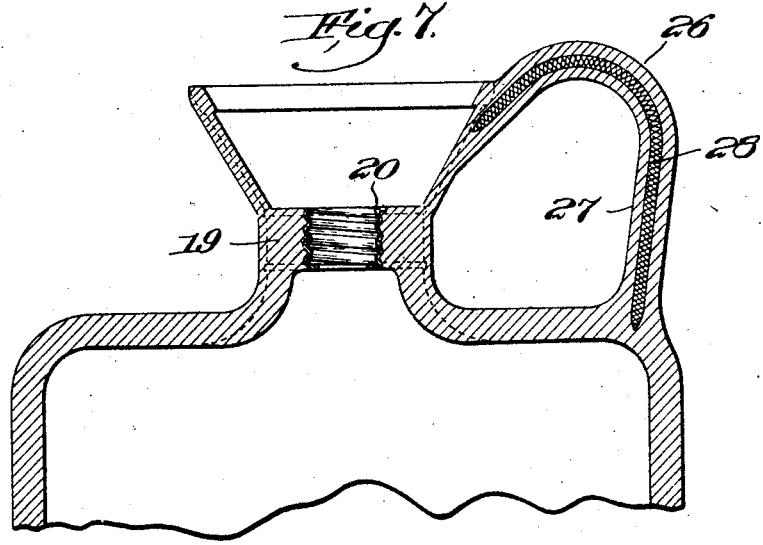
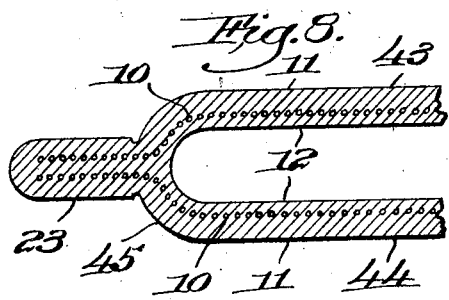
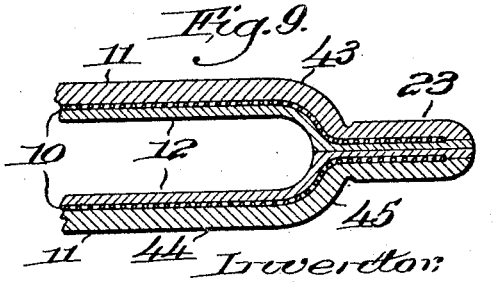

Patented Nov. 23, 1926.

1,607,963

UNITED STATES PATENT OFFICE.

JOHN W. PATTERSON, OF NEW HAVEN, CONNECTICUT, ASSIGNOR TO THE SEAMLESS RUBBER COMPANY, INC., OF NEW HAVEN, CONNECTICUT, A CORPORATION OF MASSACHUSETTS.

WATER BOTTLE AND THE LIKE.

Application filed November 18, 1922, Serial No. 601,913. Renewed August 6, 1926.

This invention relates to vulcanized rubber fabric reinforced water bottles and the like.

It is particularly desirable that rubber water bottles, or the like, possess the following properties or characteristics, viz, great strength, smooth uniform surface, leakproof jointures between the parts, light weight, high flexibility, long life, and considerable elasticity. In an effort to produce bottles having such combination of properties, bottles have heretofore been manufactured with walls comprising an intermediate ply of square woven straight cut fabric, thinly coated on both surfaces with rubber.

Thus, for example, one such type is known as the "handmade" water bottle, in making which square-woven fabric of close, tight mesh is employed, thinly coated with rubber on each surface, the various parts and joints being assembled by hand without using a core or molds, and the binder strips of rubber being merely adhesively attached to the parts render the joints liable to develop leakage in use, while the rubber layers on the fabric are liable to crack and peel off in use through improper attachment to the fabric. Another type of water bottle employs thick, stiff, square-cut duck fabric of close tight weave, thinly coated on both surfaces with rubber not penetrating the fabric, paired blanks of which are formed in a suitable mold, employing a thin sheet of paper as a core between the blanks during the process of vulcanizing, the sheet of paper also serving to prevent adhesion of the blanks, the margins of which are merely vulcanized together. Thus, in this type, the walls of the water bottle are stiff and unyielding, the edges of the fabric being exposed on the margins of the water bottle are apt to result in leakage while the thin layers of rubber not penetrating the fabric, readily peel and crack under flexing and stretching in use.

An object of the present invention is to provide a fabric reinforced molded vulcanized rubber water bottle, or the like, which may be easily and economically manufactured, free from the variuos disadvantages and defects present in the bottles hereinbefore described, and which will possess the following properties and characteristics, namely, great strength and durability, attractive appearance, integral leak-proof joints, homogeneously united inner and outer layers of rubber, desirable form, soft yielding elastic surface finish and high flexibility and elasticity.

Another important object is to provide a water bottle provided with reinforcing knitted fabric capable of an appreciable stretch, suitably coated with rubber on both surfaces, whereby in flexing and stretching in use the rubber will readily yield, yet return to its initial position without cracking.

Another important object is to provide a reinforcing knitted fabric capable of an appreciable stretch, which is coated with rubber on both surfaces, the coating of rubber on the outer surface being preferably of greater thickness than the coating on the inner surface. Both rubber layers are sufficiently thick to provide such a mass of rubber as to completely penetrate the interstices of the knitted fabric and to thoroughly impregnate the entire sheet of fabric during molding and vulcanizing, thus uniting the whole together in a homogeneous vulcanized union, whereby the knitted fabric becomes imbedded in the mass of rubber and forms an integral part of the structure, accommodating itself readily to the changing form of the walls of the water bottle in use, while the rubber layers are adapted to provide durable interior and exterior surfaces.

Another important object is to provide a very elastic rib extending around the body portion of the water bottle, the margins of the knitted fabric extending into the rib, the rubber of which in vulcanizing completely seals the fabric, and thus forms a vulcanized union therewith and consequently produces a water-tight joint. The elastic rib further serves to maintain the water bottle in symmetrical shape, especially when the bottle is filled.

With the above and other objects in view, which will readily appear as the nature of the invention is better understood from this disclosure, the same consists in the novel form, combination, and arrangement hereinafter more fully described, illustrated and claimed.

Referring to the accompanying drawings:—

Figure 1 is a plan view of one of the female mold sections with the sectional core assembled therewith.

Figure 2 is a longitudinal section of the complete molding device taken on the line 2—2 of Figure 1.

Figure 3 is a transverse section of the complete molding device taken on the line 3—3 of Figure 1.

Figure 4 is a view of a completed bottle, portions being broken away to illustrate certain of the novel features of the construction.

Figure 5 is a plan view of one of the unvulcanized blanks, portions being broken away and laid back to show certain details of the construction.

Figure 6 is a fragmentary view of the bottom of the bottle, showing the rubber insert for sealing the slit in the bottom of the bottle, through which the core is withdrawn.

Figure 7 is a view of the upper part of the bottle split centrally flatwise to show the integral flange of rubber and the metal thimble associated with the walls of the bottle during the molding and vulcanizing operation.

Figure 8 is an enlarged fragmentary cross sectional view of the finished bottle on the line 8—8 of Figure 4.

Figure 9 is a view similar to Figure 8, the bottle being shown in the unvulcanized condition.

For the purpose of affording a clear understanding of the novel features of the present invention, the invention will be described in connection with one of the methods of manufacturing water bottles. In the manufacture of such bottles a sheet of stockingette 10 is first run through a calender whereby the rubber layers 11 and 12 are applied to its surfaces. The rubber layer 11, which will constitute the outer surface of the finished bottle, is preferably made of greater thickness than the layer 12 which will constitute the inner surface, as it is desirable that the outer layer have sufficient body to withstand frictional wear, stretching, flexing and hard usage and to efficiently resist the ageing action of freely circulating currents of air to which it is subjected in service. Preferably both rubber layers are made of sufficient thickness to provide enough rubber stock to thoroughly penetrate and impregnate the sheet of stockingette during the molding and vulcanizing of the bottle and to insure ample rubber on both the surfaces of the stockingette to completely conceal the same, and give the finished bottle a smooth, uniform, elastic and attractive exterior.

From the sheet of multi-ply material so prepared, are cut or died blanks 13, each blank being of a suitable pattern to constitute one-half of a bottle, and comprising a mouth portion 14, a neck portion 15, body portion 16, and tab portion 17. (See Figure 5.) A pair of these blanks, when joined together around the margins will form the walls of the bottle.

Preparatory to placing a pair of the blanks in the vulcanizing molds, there is applied to the surface 12 of the neck portion 15 of each blank an oblong-shaped block 18 of unvulcanized rubber. The pair of blocks 18 are softened during the vulcanizing step and molded integrally together to form an elliptical flange 19 in the neck of the bottle, in which the metal thimble 20 for the bottle stopper is embedded. (See Figure 7.)

There is also applied around the outer peripheral margin of each of the blanks a sealing and reinforcing strip 21 of unvulcanized rubber. These strips overlap the margins of the surfaces 11 of the blanks and extend outwardly beyond such margins. The outwardly extending portions 22 of the strips are united together during the vulcanizing step to form a thick covering of rubber over the edges of the blanks, thus effectively sealing such edges against the entrance of moisture and water into the fabric. It is to be noted at this point that the rubber of the strips enters into homogeneous union with the rubber of the layers 11 and 12 during the vulcanizing step to form in conjunction with the joined margins a strong elastic rib 23 extending outwardly from the edge walls of the bottle and centrally thereof. (See Figure 4.) This rib assists in maintaining the bottle in symmetrical shape when filled. The sealing strips further serve to provide ample rubber stock to insure a strong, integral bond between the blanks at their joined margins.

A grommet ring 24 of unvulcanized rubber is next applied to the surface 11 of the tab of each of the blanks. These rings form in the completed bottle a grommet around the opening 25 provided for suspension of the bottle.

A handle 26 for the bottle is next prepared. This consists of a tube 27 of unvulcanized rubber reinforced centrally by a core 28 of rolled friction coated fabric. One end of the handle is split centrally to provide two arms 29 and 30, one of the arms being adapted for union with one of the blanks and the other for union with the other blank. The other end 31 of the handle is formed substantially wedge-shaped for union with the mouth of the bottle. The handle is set in place by adhesively attaching one of its arms 29 to the body portion of one of the blanks and adhesively securing its end 31 to the mouth portion of the blank. (See Figures 5 and 7.)

When the various parts have been prepared as set forth, one of the blanks is placed in the cavity of one of the female mold sections. A sectional core is then superposed on the blank. This core comprises two main elements 32 and 33. (See Figures 1, 2 and 3.)

The element 32 comprises a flaring sleeve 34 adapted to form the interior of the mouth and neck of the bottle. This sleeve is provided with a longitudinal central bore 35 and is formed at one end with a shoulder 36 and a reduced cylindrical extension 37. This extension 37 is adapted to receive a metal thimble 20, such thimble being adapted to be embedded in the neck flange 19 of the bottle during the vulcanizing process. The thimble is retained in place on the reduced extension 37 by the shoulder 36 of the sleeve and the flange 38 formed on one end of a rod 39, which is detachably fitted in the bore 35 of the sleeve. The upper end of the rod 39 extends beyond the top of the sleeve and is provided with a slot 40 through which a wedge pin 47 is driven to draw the rod upwardly to clamp the thimble between the flange 38 and the shoulder 36.

The other element 33 of the sectional core comprises a wide, flat, relatively thick, rigid body member 42, adapted to support the inner faces of the walls of the body portion of the bottle during vulcanization. It is to be noted at this point that the shape of the core is such as to form a bottle having a front wall 43 a rear wall 44, and an edge wall 45. The edge wall serves to space the front and rear walls a sufficient distance apart to provide a cavity in the finished bottle normally of ample size to hold a large quantity of water without producing undesirable distortion of the walls of the bottle.

The upper end of the element 33 is formed with a pin 46 adapted to enter a recess 47 in the rod 39 of the core element 32 to secure the two core elements or sections together so that each element will be capable of adjustment in the mold independent of the other.

The lower end of the core element 33 is formed with a tongue 48 adapted to protrude through the base of the bottle to serve to maintain the edges of the blanks through a portion of the base of the bottle separated during the vulcanization of the bottle in order to provide an opening 49 for the final withdrawal of the core element therethrough. (See Figure 6.) It is not essential that the opening or slit be made in the bottom of the bottle as it may be satisfactorily formed at any other suitable place. It is further not essential that the core be provided with means for forming a slit as the slit may be cut in the bottle after the bottle is formed, and then sealed.

After the core sections have been assembled as set forth, the core is superposed on the blank within the mold section 50 and a companion blank is then applied. The mold section 51 is the brought down, after which the bottle is subjected to suitable vulcanization. During vulcanization the rubber composing the layers 11 and 12 will soften sufficiently to thoroughly penetrate and impregnate the sheet of stockingette 10, and to pass under the pressure of the molds completely through the interstices existing between the strands of the stockingette, so that the two layers of rubber will be homogeneously united at a great number of closely spaced points throughout the entire walls of the bottle. The layers of rubber and fabric in the finished bottle will thus be united into a permanent integral sheet or wall. (See Figures 8 and 9.) Tests have shown that the final union between the rubber layers and fabric is so strong that it is impossible to separate or peel the rubber from the fabric. This feature presents important advantages as it gives to the walls of the bottle such strength that stretching or flexing thereof will not produce cracks in the rubber or peeling, or separation of the rubber from the fabric reinforcement. It is to be noted that in the fabric reinforced water bottles heretofore known the layers of fabric and rubber exist in the article as distinct, independent layers, the rubber layers being merely united to the surfaces of the sheet of fabric. Such weak construction permits the layers to peel or split away from the fabric when the walls of the bottle are stretched or flexed in service.

When the bottle has been built up as set forth, it is suitably vulcanized in the molding device, after which the molds are opened and the bottle with the sectional core in place therein is removed.

The core element 33 of the sectional core is next withdrawn through the slit 49 formed at the base of the bottle by the tongue 48. As has been previously pointed out, the core element 33 is made of sufficient thickness to space the front and rear walls of the completed bottle a considerable distance apart to provide a body cavity in the bottle of appreciable depth adapted to contain a large quantity of water without objectionable distortion of the bottle, and to provide a bottle which when filled with the proper quantity of water will afford a broad, flat surface for contact with the body of the user. (See Figures 3 and 8.) It is desirable from the standpoint of facility in manufacture and ultimate efficiency of the bottle that the slit 49 provided for the withdrawal of the core be made as short as possible. It is especially desirable that the unslit portions 52 be left at the base of the bottle between the sides of the bottle and the ends of the slit so that a strong, permanent vulcanized joint may be formed between the ears 53 of the sealing piece 54 used for closing the slit. (See Figure 6.) From the foregoing it will be apparent that in order that the wide relatively thick core element 33 may be withdrawn through the relatively narrow slit, the lips of the slit and the material adjacent thereto must be capable of a great amount of stretch to enable the slit to be temporarily enlarged sufficiently to permit withdrawal of the core element.

After the core element 33 has been withdrawn through the slit, the sealing piece of unvulcanized rubber 54 is placed between the lips of the slit. Its ears 53 overlap the unslit portions 52 at the base of the bottle. Suitable molding devices are then employed to engage the parts at the base of the bottle to hold them under proper pressure during the process of vulcanizing the lips of the slit permanently together.

The bottle manufactured by the method set forth can be rapidly produced at a relatively low cost for labor, and will possess the following desirable properties or characteristics, viz.; great strength, strong integral leak-proof joints, relatively light weight in proportion to strength, homogeneous union between the rubber layers, suitable form for containing a large amount of water without undesirable distortion, great elasticity, unusual durability, and an attractive smooth elastic external surface.

While the bottle has been described as being formed with a reinforcing ply of stockingette, it is to be understood that bias cut fabric or any other suitable material having an appreciable stretch adapting it to efficiently accommodate itself to the forms of the walls of the finished article, to permit penetration by the rubber layers, or to permit enlargement of the slit for core removal, may be used.

It is to be particularly noted that the bottle described has an outer layer of rubber of greater thickness than the inner layer to give the outer layer sufficient body to entirely conceal the fabric reinforcement and impart a uniform smooth surface to the finished article, and to efficiently resist frictional wear and the disintegrating action of the circulating currents of air to which it is constantly subjected in service. Thorough tests have shown that rubber surfaces which are in contact with moving currents of air deteriorate much more rapidly than surfaces which are exposed to still air. It is to be understood, however, that this invention is not limited to the use of a thicker outer layer than inner, it being within the contemplation of the invention to make the respective layers of rubber of any desired thickness.

The word "deep" as used in this specification and appended claims with reference to the body cavity is intended to refer to the dimension of the cavity on a line passing directly from the front to the rear wall, and is used to differentiate from the shallow cavity or slit produced in the molded water bottles heretofore known, by the paper core.

The term "appreciable stretch" as used in this specification and appended claims with reference to the fabric reinforcement, is intended to mean a greater stretch than that possessed by the straight cut square woven fabric which has heretofore been used in the manufacture of water bottles.

While some of the preferred embodiments of the invention have been set forth, it is to be understood that various modifications in the shape, number, material, union and assembly of the various elements may be resorted to without sacrificing any of the advantages of the invention defined in the appended claim.

What I claim and desire to secure by Letters Patent is:

A molded vulcanized rubber water bottle or the like, having front, rear, and edge walls, said article being formed of two blanks lap-jointed at their margins, each of the blanks comprising a ply of fabric and inner and outer layers of rubber, the outer layer of rubber being thicker than the inner layer the said layers of rubber being integrally united together at closely spaced spots by portions of their mass penetrating entirely through the interstices in the plies.

JOHN W. PATTERSON.